April 14, 1970  GOHEE MAMIYA  3,505,810

SYSTEM FOR GENERATING POWER

Filed Dec. 4, 1967  5 Sheets-Sheet 1

April 14, 1970  GOHEE MAMIYA  3,505,810
SYSTEM FOR GENERATING POWER
Filed Dec. 4, 1967  5 Sheets-Sheet 2

United States Patent Office 3,505,810
Patented Apr. 14, 1970

3,505,810
SYSTEM FOR GENERATING POWER
Gohee Mamiya, 105 Mitsuzawa Kami-cho, Kanagawa-ku, Yokohama, Japan
Filed Dec. 4, 1967, Ser. No. 687,641
Claims priority, application Japan, Mar. 13, 1967, 42/15,677; May 22, 1967, 42/32,456
Int. Cl. F01k 25/00
U.S. Cl. 60—36                              1 Claim

ABSTRACT OF THE DISCLOSURE

A power generating system which comprises a circuit including a generator section, a condenser section, an evaporator section and an absorber section connected to each other to form a conventional absorption refrigerating system; a superheater section connected to said condenser, means for introducing the medium through said superheater section to a power section where the medium is expanded adiabatically, means for condensing the medium discharged from said power section, said condensing means being placed in said evaporator section of said circuit, means for transmitting said condensed medium from said condensing means to an evaporator which is arranged in the heat exchanging relation with said condenser in said refrigeration circuit.

---

Figure 1:
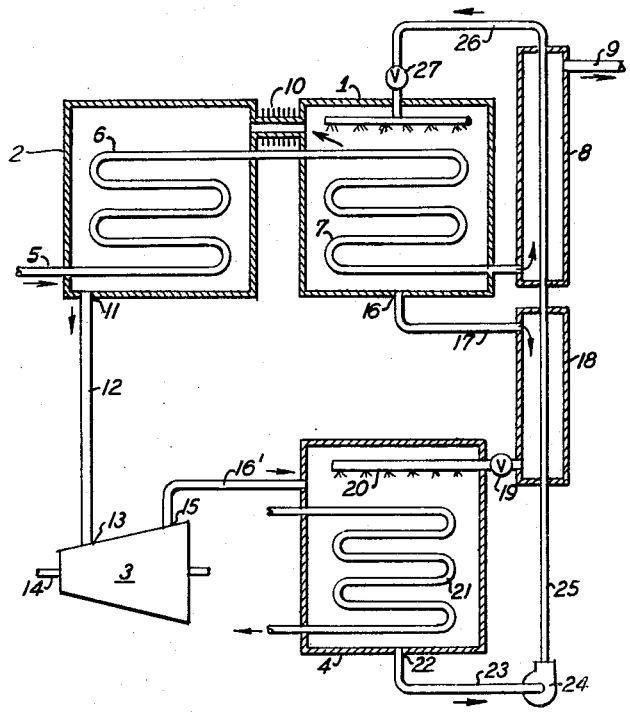

This invention relates to power generation systems, and particularly to a system for generating power using a refrigerant.

This invention directs to a system for generating power using a refrigerant, wherein the refrigerant is heated by utilizing waste heat or waste vapor such as steam from a plant, the heat refrigerant vapor is introduced at an elevated temperature and pressure into a power section in which the refrigerant vapor is adiabatically expanded to generate power, and the refrigerant vapor from the power section is recycled to the system to use it repeatedly.

Accordingly, it is the primary object of the present invention to provide a relatively small but highly efficient power generation system adapted to drive a prime mover for turbine or the like by utilizing waste heat to obtain power.

Another object of the present invention is to provide a system for generating power by utilizing a low temperature heat source.

A further object of the present invention is to provide a power generation system which may be operated at a very low cost.

In one aspect of the present invention, a generator section, a superheater section, a power section and an absorber section and operatively interconnected, a refrigerant such as ammonia is vaporized in the generator section and the vapor is fed to the power section to generate power through the adiabatic expansion of the vapor, and heating coils in the generator and preheater sections and other heat-exchangers utilize plant waste heat or steam as their heating medium. A lower pressure ammonia vapor discharged from the power section is fed to the absorber section in which the vapor is absorbed by a dilute ammonia solution, and the ammonia solution thus concentrated is recycled to the generator section after it is pressurized and heated.

In the second aspect of the present invention, a circuit comprising a generator, a condenser, an evaporator and an absorber arranged as an absorption refrigeration system is provided, a separate superheater for superheating a high pressure cooling or heating medium is connected to the condenser in the circuit, and the coolant or the hot medium is introduced to a prime mover such as a turbine to generate power through its adiabatic expansion, the cooling or heating medium of which pressure and temperature has been reduced by the prime mover is fed to the condenser through a cooling coil in the evaporator of the absorption refrigeration system to vaporize the medium and the vaporized medium is recirculated to a circuit of the prime mover. In the above system, a medium to be used in the prime mover circuit may be selected independently of the medium used in the circuit of the absorption refrigeration system.

According to the third aspect of the present invention, a refrigerant superheater section, a power section, and a cooler section are operatively connected to a circulating circuit, the refrigerant is subjected to the heat exchange with an exhaust gas in the superheater, and the refrigerant is passed through the cooler section in a heat-exchanging relation with a liquefied natural gas.

In this manner, waste heat from a plant or the like may be utilized in the power generating system of the present invention and the system may also be used as means for vaporizing liquefied petroleum gases or natural gases.

In the fourth aspect of the present invention, a generator section, a superheater section, a power section and an absorber section are operatively interconnected so as to form a circuit, gaseous or liquid ammonia is used as a refrigerant, and a hot waste gas is passed through the generator and the superheater sections in the heat-exchanging relation with said refrigerant while a liquefied petroleum gas or natural gas is passed through the condenser.

Figure 2:
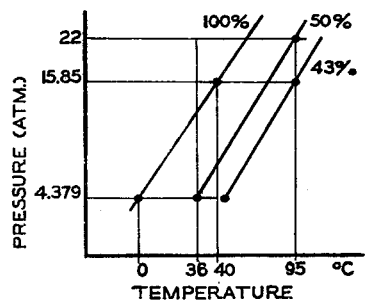
Figure 3:
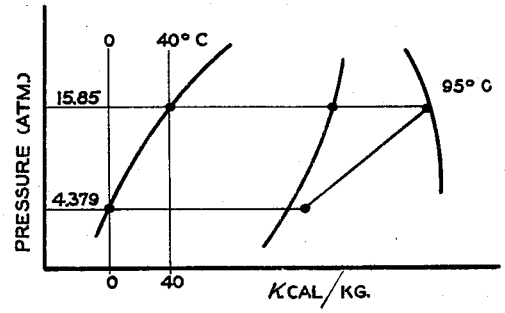
Figure 4:
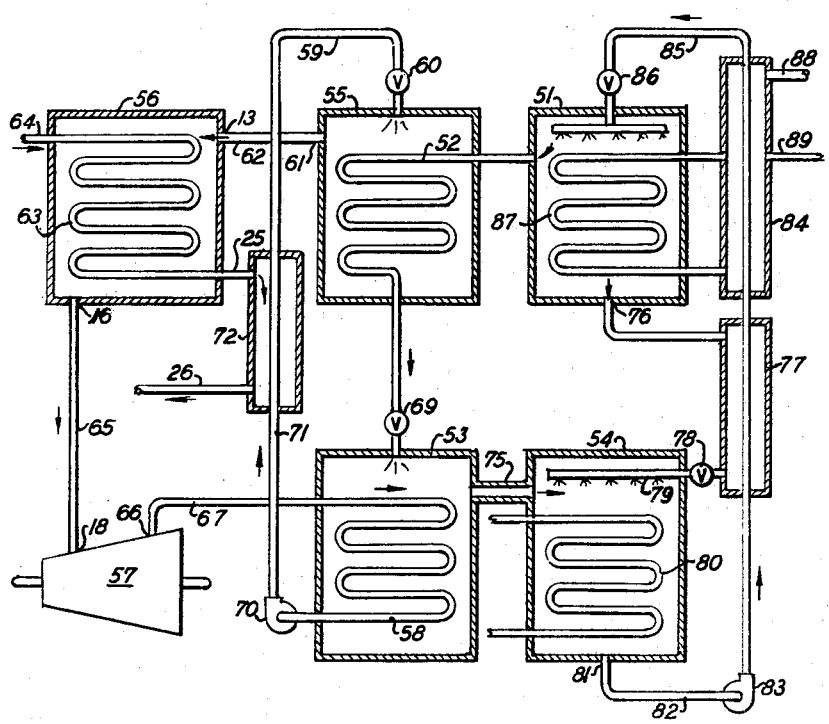
Figure 5:
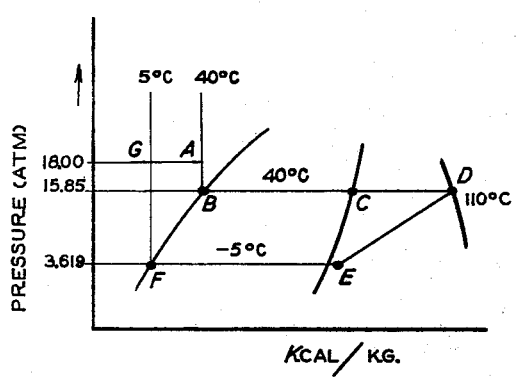
Figure 6:
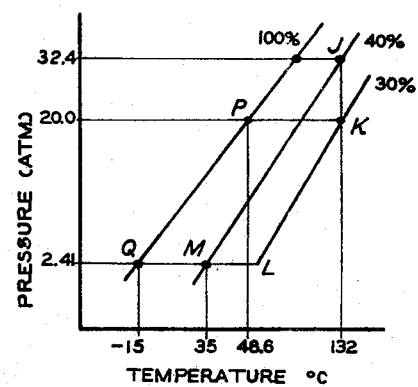
Figure 7:
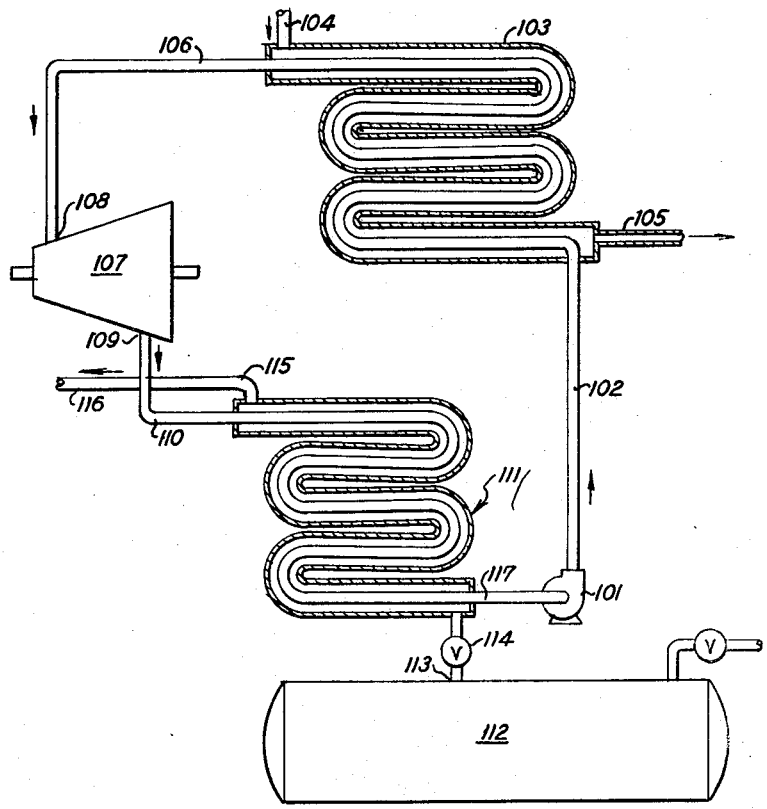
Figure 10:
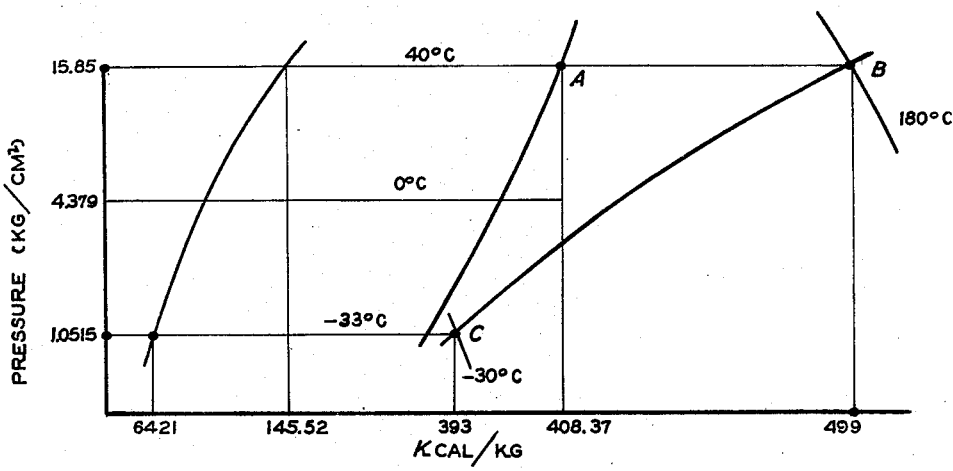
Figure 9:
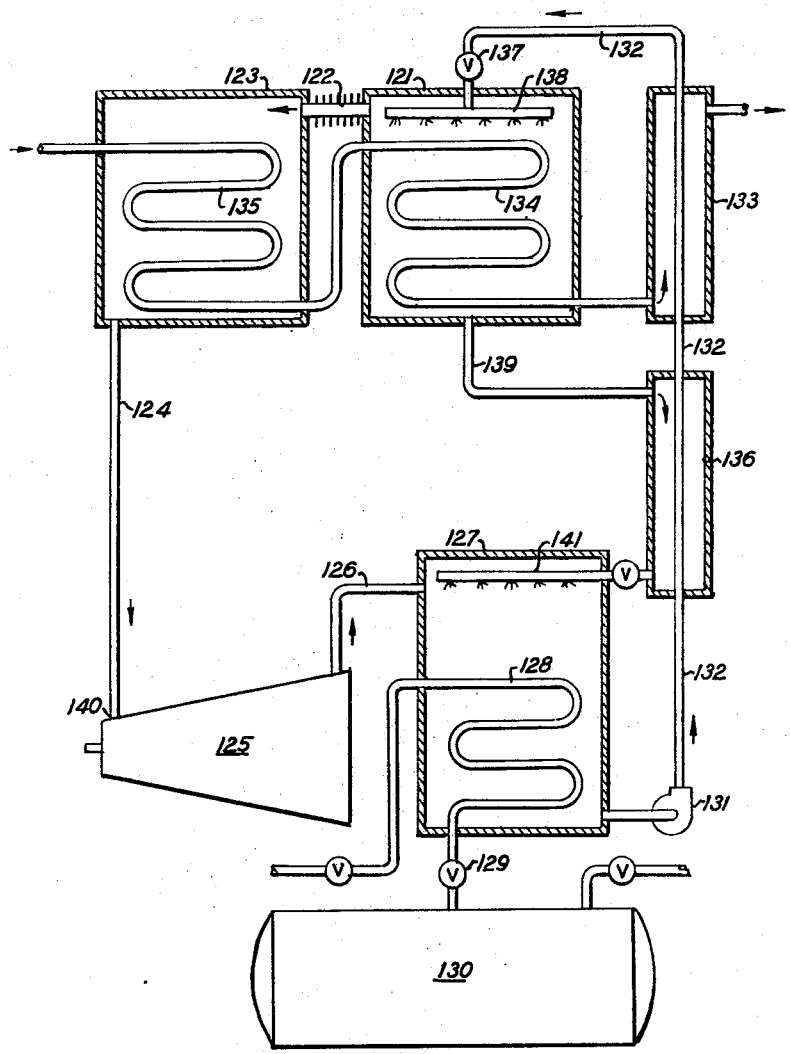
Figure 8:
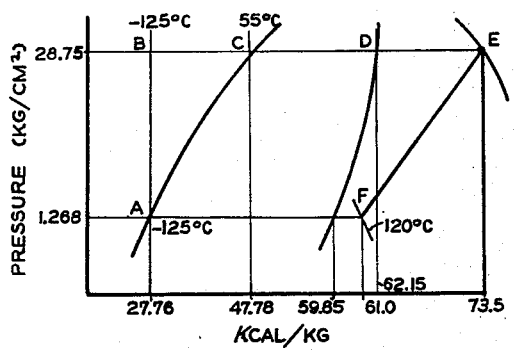
Figure 11:
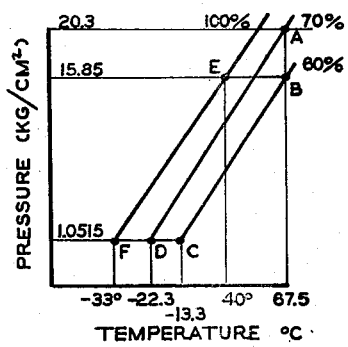
Figure 12:
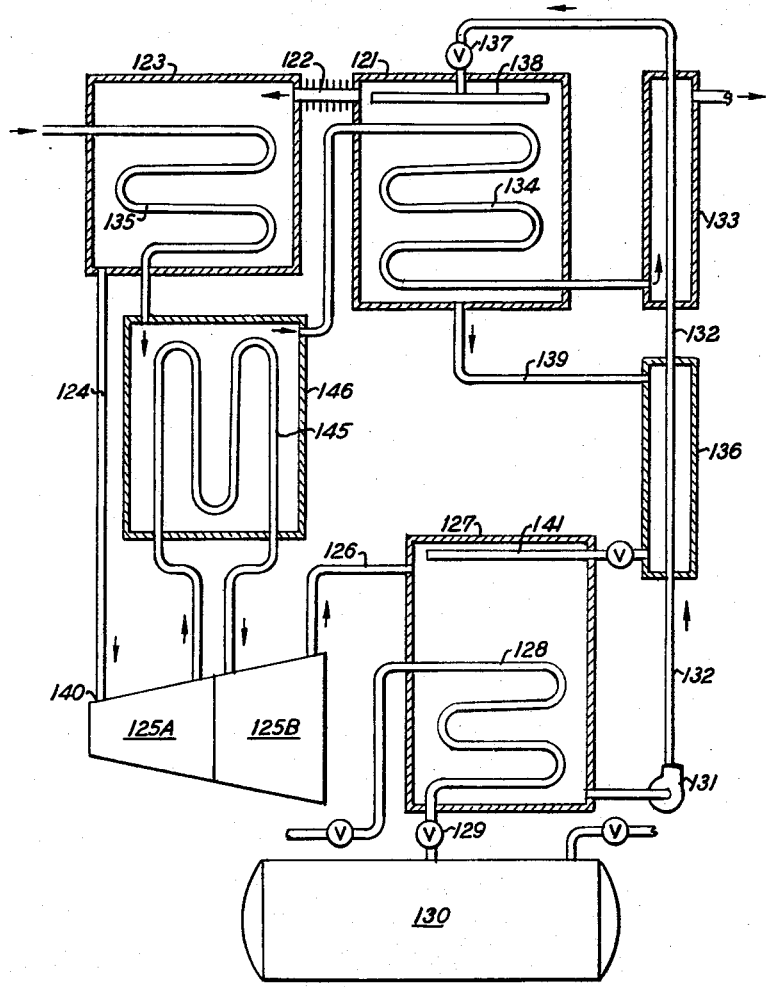
Figure 13:
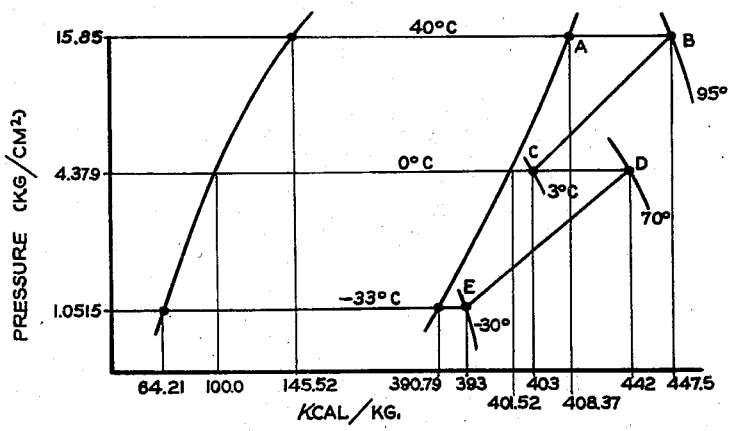

Other objects and advantages of the present invention will become clear from the following detailed description with reference to the accompanying drawing, wherein:

FIGURE 1 is a schematic view of a preferred embodiment of the present invention, FIGURES 2 and 3 are diagrams illustrating the operation of the system of FIGURE 1, FIGURE 4 is a schematic view of another preferred embodiment of the present invention, FIGURES 5 and 6 are diagrams illustrating the operation of the system shown in FIGURE 4, FIGURE 7 is a schematic view of another preferred embodiment of the present invention, FIGURE 8 is a diagram illustrating the operation of the system of FIGURE 7, FIGURE 9 is a schematic view of still another preferred embodiment of the present invention, FIGURES 10 and 11 are diagrams illustrating the operation of the system of FIGURE 9, FIGURE 12 is a schematic view of still further embodiment of the present invention, and FIGURE 13 is a diagram illustrating the operation of the system shown in FIGURE 12.

Referring to FIGURE 1 showing one preferred embodiment of the present invention, the system comprises as main components, a generator section 1, a superheater section 2, a power section 3 and an absorber section 4. Waste hot gas or vapor is supplied from a plant or the like to the system through an inlet conduit 5 and is discharged into an outlet conduit 9 through a heating coil 6 in the superheater section 2, a heating coil 7 in the generator and a preheater 8.

A refrigerant, for example, liquid ammonia is fed from the absorber section 4 to the generator section 1 in which it is heated and vaporized by the heating coil 7, and the vaporized refrigerant is introduced into the superheater section 2. Preferably the vaporized refrigerant is introduced from the generator section 1 into the superheater section through a rectifier 10.

The refrigerant vapor is further heated in the superheater section 2 by a heating coil 6 to produce a superheated ammonia vapor at an elevated temperature and pressure and to supply the steam from outlet 11 to inlet 13 of the power section 3 which may be a turbine, through a line 12. In the power section 3, the high pressure hot ammonia vapor is adiabatically expanded to generate power. Power output of the section 3 is taken out through an output shaft 14. The ammonia vapor of which the temperature and pressure have been lowered in the power section is fed to the absorber section 4, containing a dilute liquid ammonia, through an outlet 15 and line 16 so as to be absorbed by the dilute liquid ammonia.

On the other hand, a high pressure hot liquid ammonia which has become diluted as the result of discharging ammonia vapor therefrom is introduced into heat exchanger 18 through outlet 16 and line 17, the pressure of this cooled liquid ammonia is reduced at a reducing valve 19, then it is sprayed into the absorber section 4 through a distributing pipe 20, thereupon it absorbs ammonia vapor flowing into the section 4 through line 16'.

A cooling coil 21 is provided in the absorber section 4, through which cold water or liquefied petroleum gas or natural gas is passed as will be described later, to promote the absorption of ammonia vapor.

Concentrated liquid ammonia resulting from the absorption of ammonia vapor in the absorber section 4 is advanced to a high pressure pump 24 through outlet 22 and line 23 so as to be highly pressurized, which is then fed to the heat exchanger 18 through line 25, in which it is heated by a high pressure hot liquid ammonia being fed into the absorber section from the generator section 1 through line 17. The heated liquid ammonia is further heated in the preheater 8 through which a plant waste hot gas or vapor is passed as described hereinabove, then it is fed into the generator section 1 through line 26 and valve 27.

As shown in FIGURES 2 and 3, if liquid ammonia in line 26 has a concentration of 50%, a pressure of 22 atms. and a temperature of 95° C., and pressure and temperature in the generator section 1 will be 15.85 atms. and 95° C. respectively, and the liquid ammonia will be evaporated in the generator section 1 to produce ammonia vapor at 15.85 atms. diluting the liquid ammonia to 43% in concentration. The ammonia vapor thus produced is heated in the superheater section 2 to a superheated vapor at a pressure and temperature, for example, 15.85 atms. and 95° C., which is then introduced into a turbine i.e. the power section 3 and when it is adiabatically expanded to, for example, 4.379 atms., the turbine will produce power while the temperature of the ammonia vapor will drop substantially to 0° C. When this cold ammonia vapor is fed into the absorber section 4 and is absorbed by a dilute liquid ammonia introduced from the generator section 1, a liquid ammonia concentrated to 50% at 36° C. will be produced after it is cooled by the cooling coil 21. Thus concentrated liquid ammonia is pressurized through pump 24, heated in the heat exchanger 18 and the preheater 8 and supplied to the generator section 1 through line 26 and valve 27. By repetition of such a procedure as set forth above, power may be generated.

As evident from the above description, according to the present invention, power may be generated by utilizing a low temperature heat source such as waste heat or steam and ammonia vapor entering into the generator section may be used until its temperature drops to an extremely low degree. For example, in case of steam it can be utilized to its minimum temperature of about 40° C., however, since ammonia may be used at a temperature of lower than 0° C., output obtainable thereby may be significantly increased. Furthermore, the manufacture of the prime mover and its associated components is facilitated since the system is operated at a final pressure of superatmospheric levels. However, for example, when steam is used in place of ammonia, a system should be operated under a pressure of 0.075 atm. even at the minimum effective temperature of steam, i.e. at 40° C. It is an important feature of the power generating system of the present invention in that the system may be made smaller in size than systems of the prior art for a given amount of power to be generated, since the specific volume of ammonia vapor used in the system of the present invention is much less than that of steam which is conventionally used in systems of the prior art. For example, the volume of steam at 40° C. and 0.075 atm. is 19.53 m.$^3$/kg., while that of ammonia at 0° C. and 4.38 atm. is 0.23 m.$^3$/kg.

Now reference is made to FIGURE 4 which shows another embodiment of the present invention schematically. The system shown in FIGURE 4 comprises a generator section 51, a condenser coil 52, an evaporator section 53, an absorber section 54 which function substantially as the components of a conventional absorption refrigeration machine, an evaporator section 55, a superheater section 56, a power section 57 and a condenser coil 58 which are the essential components of the power generating system.

A high pressure refrigerant in line 59 flows into the evaporator section 55 of the power generating system through an expansion valve 60 and cools refrigerant vapor introduced from the generator section 51 into the condenser coil 52 to condense the vapor in a heat exchange relation, while the high pressure refrigerant is vaporized in the section 55 and is fed therefrom to the superheater section 56 through outlet 61 and line 62.

A heating coil 63 is provided in the superheater section 56, and a plant waste heat or steam or a suitable heat source is introduced to the heating coil 63 through line 64 to superheat the refrigerant vapor fed from the evaporator section 55. The hot vapor thus superheated is then introduced into the power section 57 which may be, for example, a turbine, through line 65 to generate power upon its adiabatic expansion. The vapor of which pressure and temperature have been reduced in the power section 57 is supplied to the condenser coil 58 provided in the evaporator section 53 through outlet 66 and line 67.

The refrigerant vapor in the condenser coil 58 in the evaporator section 53 is cooled by the cold refrigerant vapor fed to the section 53 from the condenser coil 52 in the absorption refrigeration system through an expansion valve 69, so as to be liquefied. The refrigerant liquid condensed in the condenser coil 58 is pressurized by a pump 70, and after it is supplied to a preheater 72 through line 71, it is fed into the evaporator section 55 through line 59 and the expansion valve 60.

The hot medium such as waste hot gas as mentioned hereinbefore in the heating coil 63 in the superheater section 56 is led to the preheater 72 through line 73 and after it is heat-exchanged with the refrigerant passing through line 71, it is discharged through line 26.

On the other hand, refrigerant vaporized in the evaporator section 53 flows into the absorber section 54 through passage 75, and it is absorbed by a dilute refrigerant liquid which has been diluted in the generator section 51 as the result of discharging refrigerant vapor therefrom, cooled in the heat exchanger 77 and introduced into the section 54 through a reducing valve 78 and header 79, to produce a concentrated refrigerant liquid. A cooling coil 80 in the absorber section 54 permits to flow therethrough a liquefied petroleum gas or natural gas to be vaporized so as to facilitate the absorption of refrigerant vapor.

The refrigerant liquid concentrated by absorption of the refrigerant vapor is fed to a pump 83 through an outlet 81 of the absorber section 54 and line 82 to be pressurized thereby, and after it is heated in a preheater 84, it is discharged at a reduced pressure into the generator section 51 through line 85 and a flush valve 86.

The concentrated refrigerant liquid is further heated in the generator section 51 by heating coil 87 to produce refrigerant vapor which is introduced into the condenser section 52 to repeat the action as described above. Preferably a suitable heat source such as waste heat or steam is supplied from a plant to the heating coil 87 through inlet pipe 88 and the preheater 84 and it is discharged through outlet 89 after heating liquid refrigerant in the preheater and the generator section 51.

An example, in which ammonia is used as a refrigerant for both the power generating system and the absorption refrigeration system, will be described with reference to FIGURES 5 and 6. Assuming that pressure, temperature and concentration of liquid ammonia to be fed through line 85 to the generator section 51 are 32.4 atm., 132° C. and 40% respectively, and that the generator section 51 itself is being at 20 atm., and 132° C. the concentration of the liquid ammonia will be reduced to 30% in the generator section due to vaporization and this vapor will be condensed in the condenser section 52 at 20 atm. and 48.6° C.

If the ammonia liquid thus condensed is discharged into the evaporator section 53, for example, at 2.41 atm., it will be evaporated at −15° C. in the section 53.

When the liquid ammonia thus diluted to 30% is discharged from the generator section 51 into the absorber section 54 after cooling it in the heat exchanger 77 and reducing its pressure through the valve 70 to a valve equivalent to the internal pressure in the evaporator section 53, it will be concentrated to 40% at 35° C. due to absorption of ammonia vapor fed to the absorber section 54 from the evaporator section 53 through passage 75. Now if liquid ammonia at, for example, 18 atm. and 40° C. in line 59 is passed into the evaporator section 55 after reducing its pressure to 15.85 atm., it will be evaporated at 40° C. by the condenser 52. When the ammonia vapor is heated in the superheater section 56 to obtain a superheated vapor at 15.85 atm., and 100° C. and the latter is supplied to the power section 57 in which it is adiabatically expanded to, for example, 3.619 atm., power will be generated in the power section 57 while ammonia vapor of which temperature has been reduced to −5° C. in the section 57 will be discharged into the evaporator section 53 in which the vapor is liquefied by ammonia vapor at −15° C. flowing through the condenser 58 in the evaporator section 53. This liquid ammonia is passed through pump 70 and preheater 72 and the liquid at 18 atm. and 40° C. thus provided is fed into the evaporator section 55 through line 59 to vaporize the liquid. By repeating the above procedure, power may be obtained in the power section 57.

FIGURE 5 shows a cycle of the power generating system as exemplified above, on a Mollier diagram. In FIGURE 5, point A shows conditions of liquid ammonia in line 59, line BC shows evaporation in evaporator section 55, line CD shows superheating in superheater section 56, line DE shows adiabatic expansion in power section 57, EF shows condensation in condenser section 58, FG shows pressurization by pump 70, and GA shows heating by preheater 72.

FIGURE 6 shows a cycle of the absorption refrigeration system in the example described, wherein point J shows the condition of liquid ammonia in line 85, point K shows the condition of the liqud at outlet 76 of generator section 51, point L shows the condition of the liquid flowing into absorber section 54 through header 79, point M shows the condition of the liquid at outlet 81 of absorber section 54, point P shows the condition of liquefied ammonia at outlet of condenser coil 52 and point Q shows the condition of ammonia vapor in evaporator section 53.

As clear from the above description, according to the present invention, power may be generated even with waste heat or steam as well as other low temperature heat sources, and steam fed into a prime mover may be utilized by expanding it to an extremely low temperature.

For example, in case of Freon R22, even it is expanded to 0° C., its pressure will be 5.07 atm., and the volume will be 0.047 m.$^3$/kg. In other words, since its final pressure is relatively high, consequently a prime mover is operated generally at a superatmospheric pressure, the design and the manufacture of the prime mover will be much easier.

Furthermore, since the specific volume of vapor used in the system of the present invention is much lower than that of steam used in conventional prime movers, a small-sized prime mover may be used in the system of the present invention.

Referring now to FIGURE 7 which shows another embodiment of the present invention, refrigerant liquid to be circulated to the power section is fed to heater 103 through line 102 after it is pressurized by pump 101. The heater 103 has an inlet 104 for a low temperature heat source such as waste vapor or liquid from a plant or sea water to be used for heat-exchanging with the pressurized refrigerant, and an outlet 105 to discharge the used heat source.

The refrigerant liquid is converted into a superheated vapor through a saturated liquid state and a vaporized state from a supercooled state, by the heater 103.

The superheated vapor is then introduced to a prime mover 107 from the heater 103 through line 106 and inlet 108, and it is adiabatically expanded in the prime mover 107 to generate power. The prime mover 107 may be, for example, a turbine.

The refrigerant which has been served to generate power is discharged from outlet 109 of the prime mover as a gaseous refrigerant at reduced pressure and temperature, into a cooler 111 through line 110.

A liquefied petroleum gas or natural gas to be used to cool and liquefy the refrigerant vapor at a low pressure and a low temperature is stored in a storage tank 112 from which it is fed to the cooler 111 through outlet 113 and valve 114. The liquefied coolant absorbs heat from the refrigerant vapor in the cooler and is consequently vaporized at a temperature lower than that of the refrigerant vapor. This coolant gas is then fed discharged from the cooler through outlet 115 and line 116 to a tank or any other section in which it is required.

On the other hand, the refrigerant thus liquefied in the cooler is returned to the pump 101 through line 117 to complete its cycle. As it is pressurized by the pump it starts its new cycle and flows into the prime mover 107 through line 102, heater 103 and line 106.

FIGURE 8 is a diagram showing pressures of Freon 14 ($CF_4$) plotted to enthalpies in the case of a liquefied natural gas such as methane as coolant and Freon 14 as refrigerant for a prime mover are being used.

In FIGURE 8, point A indicates Freon 14 liquid at the pressure of 1.268 kg./cm.$^2$ which is further pressurized by pump 101 to 28.75 kg./cm.$^2$ as shown by point B. This liquid is fed to the heater 103 and heated with, for example, sea water, then the liquid begins to evaporate at point C, then is superheated beginning from point D, and at point E, it becomes a superheated vapor at 0° C.

When the superheated vapor thus provided is introduced into the prime mover 107, which may be a turbine, and adiabatically expanded to 1.268 kg./cm.$^2$, the turbine will generate power and Freon 14 will be in the state as indicated by point F at which its temperature is lowered to about −120° C. This vapor is cooled in the cooler 111 with the evaporation latent heat of, for example, methane gas which evaporates at pressure of 1.055 kg./cm.$^2$ and −161.7° C. or with any other latent heats less the −140° C. to provide a liquid at −125° C. (at point A) whereby to complete a cycle.

The evaporation temperature of liquefied methane gas at 1.055 kg./cm.$^2$ is −161.7° C. and the evaporation latent heat thereof is 121.1 Kcal./kg., while latent heats of the liquefied methane gas at a temperature up to −140° C. are about 10 Kcal./kg. When methane gas is liquefied at a rate of 10,000 kg./h., Freon 14 will be liquefied at a rate of about 33.520 kg./h., and if this liquefied Freon 14 is superheated as shown by point E and expanded to point F in a turbine, a power of about 420 kw. may be generated.

Since the present invention contemplates to liquefy a refrigerant gas used in a prime mover with an extremely low evaporation temperature of a material such as liquefied petroleum gases, the prime mover may be operated by a superheated vapor provided by superheating the refrigerant gas with a low temperature heat source such as sea water. Thus, since the refrigerant gas used in the prime mover can be recycled to the prime mover after it is cooled and liquefied by a coolant such as liquefied natural gas, the operating cost of the prime mover can be remarkably reduced.

Reference will be made to FIGURES 9, 10 and 11. The embodiment shown in FIGURE 9 comprises as its essential components, a generator section 121, a superheater section 123 connected to the generator section through a rectifier 122, a power section or a prime mover 125 connected to the superheater section 123 through line 124, an absorber section 127 connected to the power section 125 through line 126, a cooling coil 128 arranged in the absorber section 127, a liquefied petroleum gas tank 130 connected to the cooling coil 128 through a valve 129, line 132 connecting the bottom portion of the absorber section 127 to the top of the generator section 121 through a pressure pump 131, and heaters 133, 134 and 135 respectively provided in said line 132, generating section 121 and superheater section 123.

An example of the operation of the system illustrated in FIGURE 9 will be described. 70% liquid ammonia pressurized to 20.3 kg./cm.$^2$ by pump 131 is heated to 67.5° C. by a heat exchanger 136 and the heater 133 during its travel through pipe 132, and is discharged into the generator section 121 after its pressure is reduced to 15.85 kg./cm.$^2$ by valve 137 and distributor 138. The liquid ammonia is further heated by heater 134 in generator section 121 so as to be evaporated and the vapor thus produced flows into superheater 123 through rectifier 122. Liquid ammonia diluted to 60% due to the evaporation in section 121, flows into heat exchanger 136 through line 139 to heat concentrated liquid ammonia flowing through line 132 and thus cooled liquid as the result of the heat exchanging with the concentrated liquid ammonia is introduced to absorber section 127.

On the other hand, ammonia vapor fed into superheater section 123 is heated by heater 135 so as to produce a superheated vapor at 15.85 kg./cm.$^2$ and 180° C. which is supplied to prime mover 125 such as a turbine through line 124 and inlet 140 to generate power by expanding the vapor to 1.0515 kg./cm.$^2$.

Waste vapor at −30° C. coming out of prime mover 125 flows into absorber section 127 through line 126, and is absorbed by the 60% liquid ammonia coming down from generator section 121 through heat exchanger 136 and distributor 141.

In order to cool the liquid ammonia to −223° C. in absorber section 127, a liquefied petroleum gas which is vaporized at an extremely low temperature, is discharged from storage tank 130 into cooling coil 128 through valve 129.

The cooled liquid ammonia of which concentration increased to 70% due to absorption of ammonia vapor in the absorber section is returned to generator section 121 after it is pressurized by pump 131 to complete a cycle of operation of the system.

FIGURE 10 is a diagram of pressures of ammonia vapor in the system just described, plotted to enthalpies, wherein point A shows the condition of ammonia vapor flowing into superheater section 123, point B shows the condition thereof coming out of superheater section 123, curve BC shows variation of superheated ammonia vapor in power section 125 and point C shows the condition of ammonia vapor leaving the section 125.

FIGURE 11 is a diagram showing pressure, temperature and concentration of liquid ammonia in the above case, wherein point A shows the condition of liquid ammonia prior to flowing into valve, point B shows the condition of liquid ammonia leaving generator section 121, and point E shows the condition of ammonia vapor produced in generator section 121. Point C shows the condition of liquid ammonia flowing into absorber section 127 through distributor 141, point D shows the condition of liquid ammonia coming from absorber section 127 to pump 131, and point F shows the temperature of saturated ammonia vapor entering from generator section 125 into absorber section 127.

In the embodiment illustrated in FIGURE 12, a heat source at about 100° C. is used to heat liquid or gaseous ammonia.

The embodiment is a modification of the system shown in FIGURE 9. The power section 125 of this embodiment is consisting of first and second stage prime movers 125A and 125B coupled to each other interposing a re-superheating coil 145 therebetween, which is disposed in heater section 146 provided between heaters 133 and 134 in superheater section 123 and generator section 121 respectively, and ammonia vapor coming out of the first stage prime mover 125A is arranged to be reheated by a hot fluid flowing through the resuperheating coil 145, prior to flow into the second stage prime mover 125B.

In operation, 70% liquid ammonia pressurized to 20.3 kg./cm.$^2$ by pump 131 is heated to 67.5° C. by heat exchanger 136 and heater 133 during its passage through line 132, then reduced its pressure to 15.85 kg./cm.$^2$ by valve 137 and distributor 138 through which it is sprayed into generator section 121. The liquid ammonia is heated in generator section by heater 134 to produce ammonia vapor which is supplied to superheated section 123 through rectifier 122.

Residual liquid ammonia diluted to a 60% liquid ammonia in generator section 121 is fed through line 139 to heat exchanger 139 in which it is cooled by thicker liquid ammonia in heat-exchanging relation, then is supplied to absorber section 127.

Ammonia vapor supplied to superheater section 123 as set forth above is heated by heater 135 so as to produce superheated vapor at 15.85 kg./cm.$^2$ and 95° C., which is introduced to the first prime mover 125A such as a turbine through line 124 and inlet 140. When this superheated vapor is expanded to 4.379 kg./cm.$^2$, the turbine will generate power, while the temperature of the vapor is reduced to about 3° C.

The waste vapor at 3° C. is fed to resuperheating coil 145 in heater section 146 to heat it to 70° C., thereafter it is supplied to the second stage prime mover 125B in which it is expanded to 1.0515 kg./cm.$^2$ to increase power to be generated. Waste vapor of which temperature has been reduced to −30° C. in the second stage prime mover 125B, is led to absorber section 127 through line 126 in the similar manner as described with reference to the embodiment illustrated in FIGURE 9.

FIGURE 13 is a diagram showing the conditions of ammonia vapor described in conjunction with FIGURE 12. As seen in the diagram, the condition of ammonia vapor is changed from point A to point B in superheater section 123, the vapor is expanded in the first stage prime mover 125A from point B to point C, and is further expanded in the second prime mover from point D to point E.

Pressure, temperature and concentration of the ammonia vapor in this case are similar to that illustrated in and described referring to FIGURE 11 hereinbefore.

What I claim is:
1. In a system for generating power from a refrigerant, the combination of an absorption refrigerating machine comprising a generator section, a condenser coil, an evaporator section, and an absorber section connected in sequence to form a first closed loop, with a power generating system comprising an evaporator section, a superheater section, a power section and a condenser coil connected in sequence to form a second closed loop, the condenser coil of the first loop being in heat exchange with the evaporator section of the second loop and the condenser coil of the second loop in heat exchange with the evaporator section of the first loop.

References Cited

UNITED STATES PATENTS

| 2,737,031 | 3/1956 | Wulle. | |
| 2,751,748 | 6/1956 | Bachl | 60—36 |
| 3,195,304 | 7/1965 | Stern et al. | 60—36 |
| 2,982,864 | 5/1961 | Furreboe | 60—95 XR |

FOREIGN PATENTS

| 29,690 | 12/1897 | Great Britain. |

MARTIN P. SCHWADRON, Primary Examiner

ROBERT R. BUNEVICH, Assistant Examiner